US007725905B1

(12) United States Patent
Doshi et al.

(10) Patent No.: US 7,725,905 B1
(45) Date of Patent: May 25, 2010

(54) MEDIA ACCELERATOR INTERFACE API

(75) Inventors: Sandeep Doshi, San Jose, CA (US); Hans Graves, Brookline, NH (US); Ramaiyer Ramesh, Sunnyvale, CA (US)

(73) Assignee: GlobalFoundries Inc., Grand Cayman (KY)

( * ) Notice: Subject to any disclaimer, the term of this patent is extended or adjusted under 35 U.S.C. 154(b) by 1777 days.

(21) Appl. No.: 10/843,255

(22) Filed: May 10, 2004

(51) Int. Cl.
*G06F 9/46* (2006.01)
*G06F 5/00* (2006.01)

(52) U.S. Cl. ....................................... 719/328; 345/502

(58) Field of Classification Search .................. 719/328
See application file for complete search history.

(56) References Cited

U.S. PATENT DOCUMENTS

| | | | | |
|---|---|---|---|---|
| 5,889,674 | A | 3/1999 | Burdick et al. | 364/468.28 |
| 6,088,357 | A * | 7/2000 | Anderson et al. | 370/392 |
| 6,233,719 | B1 | 5/2001 | Hardikar et al. | 716/1 |
| 6,340,997 | B1 * | 1/2002 | Borseth | 348/731 |
| 6,366,824 | B1 | 4/2002 | Nair et al. | 700/115 |
| 6,463,447 | B2 | 10/2002 | Marks et al. | 707/513 |
| 6,865,339 | B1 * | 3/2005 | Gable et al. | 386/109 |
| 2002/0055886 | A1 | 5/2002 | Hinckley | 705/26 |
| 2002/0085021 | A1 * | 7/2002 | Sullivan et al. | 345/716 |
| 2002/0112097 | A1 * | 8/2002 | Milovanovic et al. | 709/331 |
| 2004/0002969 | A1 * | 1/2004 | Perng et al. | 707/3 |
| 2005/0111819 | A1 * | 5/2005 | Cormack et al. | 386/46 |

OTHER PUBLICATIONS

Tibco "Tibco Business Works" Tibco Data Sheet, Technology. 2002.
Tibco "Tibco Portal Solutions" Tibco Data Sheet, Technology 2002.
Tibco "Tibco Messaging Solutions" Tibco Data Sheet, Technology 2002.
http://www.brooks-pri.com/html/352_apf_real_time_dispatcher.cfm?outputtype=print, Brooks-Pri Automation, Inc APF Real Time Dispatcher, Nov. 11, 2002.
Triniti, Architects of the Virtual Enterprise "Enabling Business Solutions Across the Supply-Chain" 2000.

* cited by examiner

*Primary Examiner*—Hyung S Sough
*Assistant Examiner*—Abdou K Seye
(74) *Attorney, Agent, or Firm*—Hamilton & Terrile, LLP; Stephen A. Terrile

(57) ABSTRACT

A method of interfacing with a media accelerator which includes providing a commands layer, providing a capabilities layer, and providing a discontinuity layer. The commands layer sends commands to the media accelerator. The capabilities layer obtains application capabilities from an application. The discontinuity layer provides discontinuity commands to the media accelerator.

20 Claims, 3 Drawing Sheets

MEDIA ACCELERATOR INTERFACE API

BACKGROUND OF THE INVENTION

1. Field of the Invention

The present invention relates to media accelerators, and more particularly to application program interfaces (APIs) for use with media accelerators.

2. Description of the Related Art

It is known to provide a software interface to interact between various aspects of a program or between various devices. This software interface is often referred to as an application program interface (API). Programmers rely on software interfaces so that they can focus on the specifics of their application rather than on the specifics of controlling a particular program or device.

Because they are designed for specific tasks, peripherals may be better at performing certain types of functions than the host processor. For example, a video card may have special purpose hardware that can copy pixels much faster than the CPU. A general software interface may not take advantage of this particular feature or may include additional layers of code that consume valuable processor cycles and time before the operation is even started on the peripheral.

One possible design for multimedia applications incorporates a host processor and a companion media processor. It is desirable to provide an application program interface for interfacing between the host processor and the companion media processor.

SUMMARY OF THE INVENTION

In accordance with the present invention, an application program interface is provided which allows a media processing application executing on a host processor to control multimedia programs executing on a companion media processor such as a digital signal processor.

In one embodiment, the invention relates to a method of interfacing with a media accelerator which includes providing a commands layer, providing a capabilities layer, and providing a data transport layer. The commands layer sends commands to the media accelerator. The capabilities layer obtains and sets application capabilities from an application. The data transport layer provides a way of transporting data to and from the media accelerator.

In another embodiment, the invention relates to a media accelerator system which includes a media accelerator, and a processor coupled to a high speed bus. The processor includes a media accelerator interface. The media accelerator interface includes a commands layer, a capabilities layer and a data transport layer. The commands layer sends commands to the media accelerator. The capabilities layer obtains application capabilities from an application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
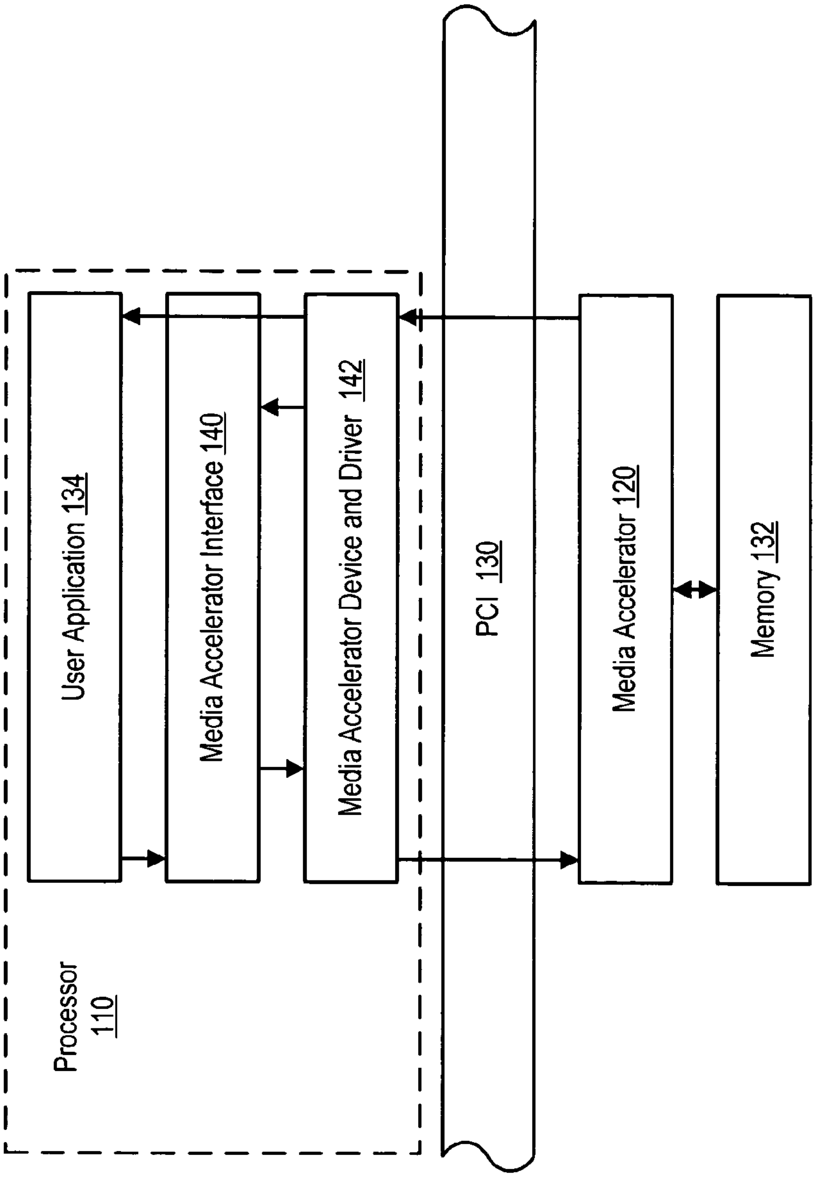
FIG. 1 shows a schematic block diagram of a media accelerator system.

Referring to FIG. 1, a schematic block diagram of a media accelerator system 100 is shown. The media accelerator system 100 includes a host processor 110 which is coupled to a media accelerator 120 via a bus 130. The media accelerator 120 is coupled to a local media accelerator memory 132.

The host processor 110 communicates with the media accelerator 120 by executing a user application 134, which communicates with media accelerator interface 140 which communicates with a media accelerator device driver 142.

Figure 2:
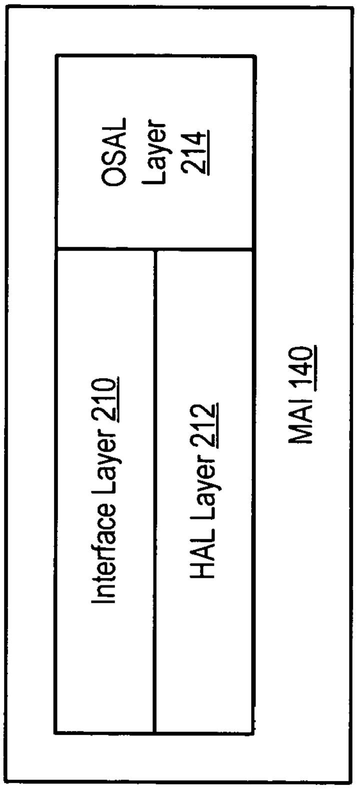
FIG. 2 shows a schematic block diagram of a media accelerator interface.

Referring to FIG. 2, the media accelerator interface 140 includes an interface layer 210, a hardware abstraction layer 212 and an operating system abstraction layer 214 (OSAL). The media accelerator interface 140 is layered over the media accelerator device driver 142 (which is, e.g., a PCI device driver) which is executing on the host processor 110.

The media accelerator interface 140 provides an optimized interface between a host processor 110 and a media accelerator 120. The media accelerator interface 140 provides asynchronouse data transport layer between the host processor 110 and the media accelerator 120. The media accelerator interface 140 provides for setup and configuration for audio/video (AV) (i.e., multimedia) playback. The media accelerator interface 140 provides AV synchronization options at the host processor 110 and media accelerator 120. The media accelerator interface 140 provides common interfaces for applications to access the media accelerator 120 to load, start and control media processing functions on the media accelerator 120. The media accelerator interface 140 is operating system and hardware independent. The media accelerator interface 140 includes a stateless multiple thread safe layer that does not perform any data movement.

The media accelerator interface 140 provides a multi buffered direct memory access (DMA) scheme that allows efficient transfer of compressed video across the bus 130 between a host and a target with minimal copies of the transferred compressed video. The media accelerator interface 140 provides the ability to configure a media processing application (i.e., a codec) that is loaded and executing on the media accelerator 120. The media accelerator interface 140 improves load times for the media accelerator 120 by allowing applications executing on the media processor 120 to be loaded and configured via separate commands. The media accelerator interface 140 includes a reader component to support an improved DMA transfer scheme. The media accelerator interface 140 includes data and time discontinuity handling schemes to provide channel change, trick modes and end of file conditions.

Discontinuity handling interfaces within the media accelerator interface 140 apply to media data transferred over the bus 130.

Figure 3:
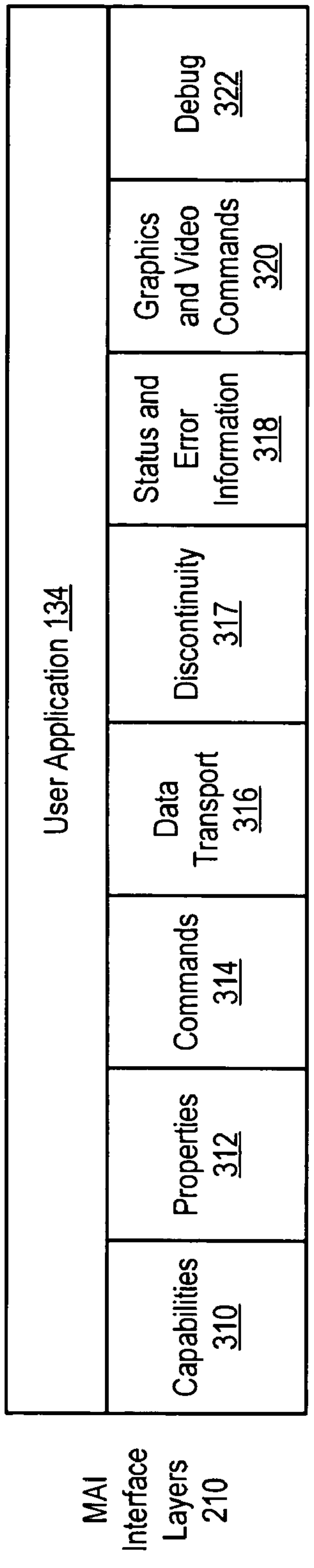
FIG. 3 shows a schematic block diagram of a media accelerator interface application program interface.

FIG. 3 shows a schematic block diagram of a media accelerator application program interface layer 210 of the media accelerator interface 140. The media accelerator program interface layer 140 includes a capabilities layer 310, a properties layer 312, a commands layer 314, a data transport layer 316, a status and error information layer 318, a graphics and video commands layer 320 and a debug layer 322.

The capabilities layer 310 allows applications executing on the media accelerator 120 to be queried for capabilities and for the applications to be flexibly configured. The capabilities layer enables selection of video decoder types (e.g., if an application supports a WMV9 video decoder type and an MPEG2 video decoder type, one of the video decoder types may be selected). The capabilities layer enables selection of audio decoder types (e.g., if an application supports an AC3 audio decoder type and an MPEG2 audio decoder type, one of the audio decoder types may be selected). The capabilities layer enables selection of data input and output paths (e.g., if an application has the ability to receive data via a general purpose bus input path or via a PCI connection, on of the paths may be selected). The capabilities layer enables selection of where and whether to demultiplex AV streams either on the media accelerator demultiplexer or on the host processor demultiplexer (e.g., if an application can receive split streams (audio or video) and multiplexed streams, one of the streams may be selected).

The properties layer 312 allows applications 134 executing on the host processor 110 to query and set media and stream properties. The media properties include video properties such as width, height, video standard, etc, and audio properties such as type, format, audio sample rate, number of channels, etc. The stream properties include network properties such as network qualities, average bit rate, packet lost, etc., MPEG2 stream properties such as an interlace, aspect ratio, video standard, etc, and ASF stream properties.

The commands layer 314 includes commands that can be sent to the media accelerator 120. The commands include general commands such as play, pause, stop, etc., media commands such as audio and video decoder commands including set post processing level, set volume and mute, etc., trick mode commands such as fast forward, fast rewind, and frame mode support and stream commands such as stream seek.

The data transport layer 316 provides an asynchronous multi-buffer data transfer between the processor 110 and the media accelerator 120. The data transport layer 316 avoids copies being created before sending data to the media accelerator. For example, if an application 134 is sending data to the media accelerator 120, then data is written directly into the buffer being DMAed to the media accelerator 120. The data transport layer 316 enables creation of virtual DMA channels on a single physical DMA channel. The data transport layer 316 enables the sending of meta data along with the DMA commands. The data transport layer enables subsequent data buffering to be maintained to offset any differences in the data consumption and data arrival rates. The data transport layer 316 provides a media companion and operating system independent approach to data transport between the processor 110 and the media accelerator 120.

The discontinuity layer 317 provides for discontinuity handling. The discontinuity layer 317 includes explicit commands that can be sent any time during the playback. These explicit commands include channel change, end of file or any data discontinuity. The discontinuity handling is also provided by sending discontinuity information along with data in data transport layer 316. For example, the last packet of data may contain an end of file (EOF) indication, after which new media clip data packets can follow.

The status and error information layer 318 provides information from the media accelerator 120 to the application 134. When requesting status information, the application 134 registers a call back with the media interface 140. The error function is called when error conditions are occurring. Common error codes are used between the media accelerator 120 and the media accelerator interface 140. Errors are categorized as critical errors and non-critical errors.

The graphics and video commands layer 320 includes commands to scale, position and clip video. The graphics and video commands layer 320 also include commands to perform plane composition of video and graphics.

The debug layer 322 enables an application 134 to set a debug level and to set debug flags for the media accelerator 120. Debug levels can be set anytime during playback.

The media accelerator application program interface 140 includes a plurality of functions.

More specifically, media accelerator application program interface 140 includes an open function. The open function initializes and opens the interface to the media accelerator 120. The open function is the first function that is expected to be called by an application before calling any load engine, data or command communication functions. The open function returns a no hardware indicia if the media accelerator is not located or if the media accelerator is not responding. The open function returns a status okay indicia when the media accelerator 120 is successfully accessed.

The media accelerator application program interface 140 includes a close function. The close function closes an open interface to the media accelerator 120. The close function returns an interface uninitialized indicia if the close function is called before opening the interface via an openinterface function. The close function returns a no hardware indicia if the media accelerator is not found or if the media accelerator is not responding. The close function returns a status okay indicia when the media accelerator 120 is successfully accessed via the close function.

The media accelerator application program interface 140 includes a query number of devices function. The query number of devices (queryNumDevices) function determines a total number of media accelerator devices present in the system 100. The query number of devices function returns the number of multimedia devices present in the system.

The media accelerator application program interface 140 includes a set debug level function. The set debug level (SetDebugLevel) function sets up the interface to a debugging level and flags. This function is optional and is expected to be called after a successful call to the open function.

The media accelerator application program interface 140 includes set thread priority function. The set thread priority (SetThreadPriority) function sets a thread priority level for a particular interface thread. The set thread priority function enables user applications to set a system thread priority level for threads used within the media accelerator interface framework. The priority passed to this function is mapped to an appropriate priority value in a respective operating system.

The media accelerator application program interface 140 includes a load engine function. The load engine (LoadEngine) function loads an engine (e.g., a codec application) to the previously opened media accelerator 120. This function also opens the command interface to the codec through which media accelerator components can be selected. The load engine function is called after the open function opens the interface to the media accelerator 120. A typical sequence of calls is to load the codec, set up a media encode/decode components (using select engine capabilities) and set up any initialization values (using the Init engine capabilities function) and then to issue a start on the components (using the send command function). The load engine function returns a handle to the interface which is used in all successive calls for command and data communications to the interface. The load engine function also opens a command communication channel to the media accelerator 120. A status okay indicia is returned after the loading of the engine is confirmed.

The media accelerator application program interface 140 includes an unload engine function. The unload engine (UnLoadEngine) function unloads a previously loaded codec. The unload engine function returns an interface uninitialized indicia if the unload engine function is called on an uninitialized interface or before loading an engine.

The media accelerator application program interface 140 includes get engine capabilities function. The get engine capabilities (GetEngineCapabilities) function obtains media accelerator codec capabilities. The capabilities mainly indicate different media types supported by a media accelerator application. A media accelerator application may support more than one media type.

The media accelerator application program interface 140 includes a select engine capabilities function. The select engine capabilities (SelectEngineCapabilities) function selects the components to be included in the playback. For example, the multiplexer/demultiplexer type to use, the audio decoder to use etc.

The media accelerator application program interface 140 includes an initialize engine function. The initialize engine (InitEngine) function sets encoder and decoder startup parameters for components that are selected by the select engine capabilities function. The initialize engine function also sets parameters for components such as a net reader component (a streaming component which handles different network protocols and reads from the network).

The media accelerator application program interface 140 includes a send command function. The send command (SendCommand) function sends specific commands and any data associated with the command to the media accelerator 120. The send command function does not perform any state checking on the specific commands and data.

The media accelerator application program interface 140 includes a send discontinuity function. The send discontinuity (SendDiscontinuity) function sends a discontinuity to the codec. There are two ways that discontinuities can be flagged. The discontinuity may be flagged along with the data or the send discontinuity function may be issued to the codec. When receiving the send discontinuity command, the components are reset and the data between components is flushed. Pending data transfers within the media accelerator reader are also flushed.

The media accelerator application program interface 140 includes a create data buffers function. The create data buffers (CreateDataBuffers) function creates buffers in host shared memory for multimedia transfers from the host processor 110 to the media accelerator 120. The create data buffers function initiates a direct memory access (DMA) transfer on the media accelerator 120 and the DMA transfer is used to transfer the data. Multiple buffer DMAs may be used and DMA requests are queued on the media accelerator 120. The create data buffer function is used in conjunction with the get data buffer function to obtain an available DMA buffer from the shared memory of the host processor 110. The create data buffers function tries to obtain a maximum number of buffers specified by a number of buffers parameter. If the create data buffers function is unable to obtain the number of buffers specified, then the function keeps retrying after decrementing the number of buffers parameter by one. The actual number of buffers created is passed via a number of buffers created parameter.

The media accelerator application program interface 140 includes a get data buffer function. The get data buffer (GetDataBuffer) function obtains an available buffer from the pool of allocated DMA buffers. The get data buffer function is called before filling and requesting a DMA transfer. For a DMA transfer to the media accelerator 120, applications are expected to receive an empty buffer pointer using the get data buffer function, fill the buffer and then request a DMA transfer using the send data buffer function. The get data buffer function returns an available buffer indicia in an available parameter and the size of the buffer in a buffer size parameter. Calls to this function are non-blocking. The get data buffer function returns immediately if no empty buffer is available. The calling application should then block (or perform any other tasks) before recalling the get data buffer function.

The media accelerator application program interface 140 includes a send data buffer function. The send data buffer (SendDataBuffer) function sends the contents of the data buffer to the media accelerator 120. The buffer sending the data is asynchronous and thus return from the send data buffer function does not imply that data has been sent. A call to the send data buffer function returns immediately after sending the message on the DMA initiation. Because the DMA in initiated on the media accelerator 120, a call to this function does not guarantee that the DMA transfer has occurred. Accordingly, applications should not write in a buffer that is marked for DMA transfer; rather, applications should obtain a new empty buffer using the get data buffer function.

The media accelerator application program interface 140 includes a get data buffer status function. The get data buffer status (GetDataBufferStatus) function obtains a number of empty buffers that are available in the allocated buffer pool indicated by the crate data buffers function. The get data buffer status function passes a total number of empty DMA buffers available via a number of buffers available parameter.

The media accelerator application program interface 140 includes destroy data buffers function. The destroy data buffers (DestroyDataBuffers) function destroys a created DMA channel and frees shared memory which was created by the create data buffers function.

The media accelerator application program interface 140 includes a get available memory function. The get available memory (GetAvailableMemory) function obtains the total shared memory that is available to create DMA buffers for a specific media accelerator 120. The total shared memory available on the host processor and the total shared memory available on the media accelerator are obtained.

The media accelerator application program interface 140 includes a get properties function. The get properties (GetProperties) function obtains audio, video, network, clock, etc properties from the engine executing on the media accelerator 120. The get properties function is called when the media accelerator 120 is processing multimedia data. A list of properties is passed via a properties structure parameter.

The media accelerator application program interface 140 includes a set properties function. The set properties (SetProperties) function sets audio, video, network, clock etc. properties on the engine executing on the media accelerator 120. The list of properties is passed via a properties structure parameter. All properties defined within the structure may not be settable and depend on the engine with in use.

The media accelerator application program interface 140 includes get stream properties function. The get stream properties (GetStreamProperties) function is used to obtain advance system format ASF object information. Objects that are supported include a content description object, an extended content description object, a marker object, a script command object, a stream properties object and a stream bitrate properties object. Applications can obtain the size of stream object (to allocate a buffer) by calling the get stream properties function with a NULL buffer pointer. When the get stream properties function is called with a NULL buffer pointer, the size of the object is returned in a buffer size parameter. Applications can then allocate a buffer with the appropriate size and call the get stream properties function again with a valid pointer. Alternately, users can allocate a buffer with a maximum possible size of the ASF stream object and pass this size in the buffer size parameter. The media accelerator interface 140 then converts these buffers to the respective ASF object structures.

The media accelerator application program interface 140 includes register information callback open function. The register information callback (RegisterInfoCallback) function registers a callback function to be called by the media accelerator 120 to pass back status and information such as presentation time stamps (PTS) information to the host processor 110. The register information callback function may be either periodic or instantaneous. (The SetPulseRate function is used to specify what information is desired via call backs and with what periodicity.)

The media accelerator application program interface 140 includes a register error callback function. The register error callback (RegisterErrCallback) function registers a callback that is called when any error occurs within the engine.

The media accelerator application program interface 140 includes a set pulse rate function. The set pulse rate (SetPulseRate) function sets the frequency and contents of periodic information sent from the media accelerator 120 to the host processor 110. Applications can use the set pulse rate function to setup desired periodic information from the media accelerator 120 such as PTS values. The frequency of the call can also be set. The media accelerator interface 140 then make periodic calls to the call back specified by the application via the register callback function. Periodic calls can be shut off by setting the frequency to zero.

The media accelerator application program interface 140 includes a get debug buffer function. The get debug buffer (GetDebugBuffer) function obtains a buffer address for debug information. The logical buffer address is returned via a buffer parameter. The size of the buffer is returned in a buffer size parameter. Applications can return allocated buffer sizes to the media accelerator interface via a size parameter.

The media accelerator application program interface 140 includes a get version function. The get version (GetVersion) function provides a version of the media accelerator interface as a string passed in a version parameter.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while a particular media accelerator architecture is set forth, it will be appreciated that variations of the media accelerator architecture are within the scope of the present invention.

Also for example, the above-discussed embodiments include modules that perform certain tasks. The modules discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer implemented method of interfacing with a media accelerator comprising:
- providing a processor executing commands;
- providing a commands layer executing on the processor, the commands layer sending commands to the media accelerator;
- providing a capabilities layer executing on the processor, the capabilities layer obtaining application capabilities from an application; and,
- providing a discontinuity layer executing on the processor, the discontinuity layer providing explicit discontinuity commands to the media accelerator, the explicit commands capable of being provided any time during playback, the explicit discontinuity commands comprising a channel change command and an end of file command.

2. The method of claim 1 further comprising:
- providing a properties layer, the properties layer obtaining and setting properties for a particular device.

3. The method of claim 1 further comprising:
- providing a callbacks layer, the callbacks layer enabling a host application to register callbacks with the media accelerator.

4. The method of claim 1 further comprising:
- providing a graphics and video commands layer, the graphics and video commands layer providing graphics and video commands to the media accelerator.

5. The method of claim 1 further comprising:
- providing a data transport layer, the data transport layer enabling providing data transfer to the media accelerator.

6. The method of claim 1 further comprising:
- providing a status and error information layer, the status and error information layer providing status and error information from the media accelerator.

7. A media accelerator interface comprising:
- a commands layer stored on a computer readable storage medium, the commands layer sending commands to the media accelerator;
- a capabilities layer stored on the computer readable storage medium, the capabilities layer obtaining application capabilities from an application; and
- a discontinuity layer stored on the computer readable storage medium, the discontinuity layer providing explicit discontinuity commands to the media accelerator, the explicit commands capable of being provided any time during playback, the explicit discontinuity commands comprising a channel change command and an end of file command.

8. The media accelerator interface of claim 7 further comprising:

a properties layer stored on the computer readable storage medium, the properties layer obtaining and setting properties for a particular device.

9. The media accelerator interface of claim 7 further comprising:

a callbacks layer stored on the computer readable storage medium, the callbacks layer enabling a host application to register callbacks with the media accelerator.

10. The media accelerator interface of claim 7 further comprising:

a graphics and video commands layer stored on the computer readable storage medium, the graphics and video commands layer providing graphics and video commands to the media accelerator.

11. The media accelerator interface of claim 7 further comprising:

a data transport layer stored on the computer readable storage medium, the data transport layer enabling providing data transfer to the media accelerator.

12. The media accelerator interface of claim 7 further comprising:

a status and error information layer stored on the computer readable storage medium, the status and error information layer providing status and error information from the media accelerator.

13. A media accelerator system comprising:

a media accelerator;

a processor coupled to the media accelerator, the processor including a media accelerator interface, the media accelerator interface including a commands layer, the commands layer sending commands to the media accelerator;

a capabilities layer, the capabilities layer obtaining application capabilities from an application; and a discontinuity layer, the discontinuity layer providing explicit discontinuity commands to the media accelerator, the explicit commands capable of being provided any time during playback, the explicit discontinuity commands comprising a channel change command and an end of file command.

14. The media accelerator system of claim 13 wherein:

the media accelerator interface further includes a properties layer, the properties layer obtaining and setting properties for a particular device.

15. The media accelerator system of claim 13 wherein:

the media accelerator interface further includes a callbacks layer, the callbacks layer enabling a host application to register callbacks with the media accelerator.

16. The media accelerator system of claim 13 wherein:

the media accelerator interface further includes a graphics and video commands layer, the graphics and video commands layer providing graphics and video commands to the media accelerator.

17. The media accelerator system of claim 13 wherein:

the media accelerator interface further includes a data transport layer, the data transport layer enabling providing data transfer to the media accelerator.

18. The media accelerator system of claim 13 wherein:

the media accelerator interface further includes a status and error information layer, the status and error information layer providing status and error information from the media accelerator.

19. The media accelerator system of claim 13 further comprising:

a bus coupled between the processor and the media accelerator.

20. The media accelerator system of claim 19 wherein:

the bus conforms to a PCI bus architecture.

* * * * *